(12) United States Patent
Hills et al.

(10) Patent No.: US 8,988,661 B2
(45) Date of Patent: Mar. 24, 2015

(54) METHOD AND SYSTEM TO MAXIMIZE SPACE-TIME RESOLUTION IN A TIME-OF-FLIGHT (TOF) SYSTEM

(75) Inventors: Gage Hills, Mill Valley, CA (US); Travis Perry, Palo Alto, CA (US); Cyrus Bamji, Fremont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 581 days.

(21) Appl. No.: 12/802,117

(22) Filed: May 29, 2010

(65) Prior Publication Data

US 2011/0292370 A1    Dec. 1, 2011

Related U.S. Application Data

(60) Provisional application No. 61/217,352, filed on May 29, 2009.

(51) Int. Cl.
 *G01S 17/89* (2006.01)
 *G01C 3/08* (2006.01)
 *G01S 7/491* (2006.01)
 *G01S 17/36* (2006.01)

(52) U.S. Cl.
 CPC . *G01S 17/89* (2013.01); *G01C 3/08* (2013.01); *G01S 7/4912* (2013.01); *G01S 17/36* (2013.01)
 USPC .......... 356/5.01; 356/3.01; 356/4.01; 356/5.1

(58) Field of Classification Search
 USPC ............ 356/3.01–3.15, 4.01–4.1, 5.01–5.15, 356/6–22, 28, 28.5, 139.01–139.1; 348/208.01–208.1
 See application file for complete search history.

(56) References Cited

U.S. PATENT DOCUMENTS

2007/0115440 A1* 5/2007 Wiklof ............................ 353/69
2009/0284609 A1* 11/2009 Matsunaga .............. 348/208.12

* cited by examiner

*Primary Examiner* — Luke Ratcliffe
(74) *Attorney, Agent, or Firm* — Gregg Wisdom; Sergey Lamansky; Micky Minhas

(57) ABSTRACT

Phase-based TOF systems operate with reduced depth error due to motion blur, and/or spatial blur, and/or pixel offset by intelligently determining how best to combine pixel values, and how best to compensate for individual pixel offsets. Such determination(s) may be carried out on a per pixel basis, dynamically, in real-time during TOF operation, or on archived TOF data. Offsets for individual pixels may be dynamically calculated and subtracted from the values acquired by those pixels Individual pixel offsets may be calculated for example by combining data acquired by the same pixel at two acquisitions, 180° out of phase with respect to each other. Calculated offsets may be averaged, or on a per pixel basis, and if target object motion is detected, one or more offset calculations can be discarded rather than averaged to reduce motion blur. Offsets acquired a priori during a TOF system calibration procedure may be used.

20 Claims, 11 Drawing Sheets

METHOD AND SYSTEM TO MAXIMIZE SPACE-TIME RESOLUTION IN A TIME-OF-FLIGHT (TOF) SYSTEM

RELATION TO CO-PENDING APPLICATION

Priority is claimed to U.S. provisional patent application Ser. No. 61/217,352 filed 29 May 2009 entitled Method and System to Maximize Space-Time Resolution in a Time-of-Flight (TOF) System.

FIELD OF THE INVENTION

The invention relates generally to time-of-flight (TOF) systems in which the system emits optical energy toward a target object, and examines phase shift in the fraction of the emitted optical energy that reflects back from the target object to determine depth distance Z to the target object. More specifically the invention relates to maximizing space-time resolution for phase-based TOF systems.

BACKGROUND OF THE INVENTION

FIGS. 1A-1C depict a so-called phase shift type TOF system 50' that can measure depth distance Z between the TOF system and a target object. In such system, distances Z to a target object are detected by emitting active light modulated optical energy Sout, typically 10 MHz to 100 MHz, of a known phase, and examining phase-shift in the reflected optical signal Sin from the target object 52. Exemplary such phase-type TOF systems are described in several U.S. patents assigned to Canesta, Inc., assignee herein, including U.S. Pat. No. 6,515,740 "Methods for CMOS-Compatible Three-Dimensional Imaging Sensing Using Quantum Efficiency Modulation", U.S. Pat. No. 6,906,793 entitled Methods and Devices for Charge Management for Three Dimensional Sensing, U.S. Pat. No. 6,678,039 "Method and System to Enhance Dynamic Range Conversion Useable With CMOS Three-Dimensional Imaging", U.S. Pat. No. 6,587,186 "CMOS-Compatible Three-Dimensional Image Sensing Using Reduced Peak Energy", U.S. Pat. No. 6,580,496 "Systems for CMOS-Compatible Three-Dimensional Image Sensing Using Quantum Efficiency Modulation". FIG. 1A is based upon the above-referenced patents, e.g. the '186 patent.

In FIG. 1A, exemplary phase-shift TOF depth imaging system 50' may be fabricated on an IC 54 that includes a two-dimensional array 56 of single-ended or differential pixel detectors 58, and associated dedicated circuitry 60 for processing detection charge output by the associated detector. IC 54 preferably also includes a microprocessor or microcontroller unit 62, memory 64 (which preferably includes random access memory or RAM and read-only memory or ROM), a high speed distributable clock 66, and various computing and input/output (I/O) circuitry 68. Among other functions, controller unit 62 may perform distance to object and object velocity calculations.

In system 50', under control of microprocessor 62, optical energy source 70 is periodically energized by an exciter 76, and emits modulated optical energy toward an object target 52. Emitter 70 preferably is at least one LED or laser diode(s) emitting low power (e.g., perhaps 1 W) periodic waveform, producing optical energy emissions of known frequency (perhaps a few dozen MHz) for a time period known as the shutter time (perhaps 10 ms). Emitter 70 typically operates in the near IR range, with a wavelength of perhaps 800 nm. A lens 72 may be used to focus the emitted optical energy.

Some of the emitted optical energy (denoted $S_{out}$) will be reflected (denoted $S_{in}$) off the surface of target object 20. This reflected optical energy $S_{in}$ will pass through an aperture field stop and lens, collectively 74, and will fall upon two-dimensional array 56 of pixel or photodetectors 58, often referred to herein as pixels, arranged typically in rows and columns. When reflected optical energy $S_{in}$ impinges upon the photodetectors, photons within the photodetectors are released, and converted into tiny amounts of detection current. For ease of explanation, incoming optical energy may be modeled as $S_{in}=A \cdot \cos(\omega \cdot t + \Theta)$, where A is a brightness or intensity coefficient, $\omega \cdot t$ represents the periodic modulation frequency, and $\Theta$ is phase shift. As distance Z changes, phase shift $\Theta$ changes, and FIGS. 1B and 1C depict a phase shift $\Theta$ between emitted and detected signals. The phase shift $\Theta$ data can be processed to yield desired Z depth information. Within array 56, pixel detection current can be integrated to accumulate a meaningful detection signal, used to form a depth image. In this fashion, TOF system 40' can capture and provide Z depth information at each pixel detector 58 in sensor array 56 for each frame of acquired data.

As described in the above-cited phase-shift type TOF system patents, pixel detection information is captured at least two discrete phases, preferably 0° and 90°, and is processed to yield Z data.

System 50' yields a phase shift $\Theta$ at distance Z due to time-of-flight given by:

$$\Theta = 2 \cdot \omega \cdot Z/C = 2 \cdot (2 \cdot \pi \cdot f) \cdot Z/C \quad (2)$$

where C is the speed of light, 300,000 Km/sec. From equation (2) above it follows that distance Z is given by:

$$Z = \Theta \cdot C/2 \cdot \omega = \Theta \cdot C/(2 \cdot 2 \cdot f \cdot \pi) \quad (3)$$

And when $\Theta = 2 \cdot \pi$, the aliasing interval range associated with modulation frequency f is given as:

$$Z_{AIR} = C/(2 \cdot f) \quad (4)$$

In practice, changes in Z produce change in phase shift $\Theta$ but eventually the phase shift begins to repeat, e.g., $\Theta = \Theta + 2 \cdot \pi$, etc. Thus, distance Z is known modulo $2 \cdot \pi \cdot C/2 \cdot \omega = C/2 \cdot f$, where f is the modulation frequency. Thus there can be inherent ambiguity between detected values of phase shift $\Theta$ and distance Z. In practice, multi-frequency methods are used to disambiguate or dealias the phase shift data.

Typical time of flight (TOF) sensors require multiple image captures of different configurations to measure depth or Z-distance to a target object. Multiple TOF system acquired images from discrete points in time are then combined to yield a single depth frame. A primary source of so-called bias error results from motion of the target object over time during image acquisition. Another source of bias error is due to depth edges in space. In either case, a pixel (or an array of pixels) images more than one object and returns a single incorrect depth value. It is advantageous to maximize resolution in both space and time to minimize bias from such effects.

What is needed is a method and system whereby resolution in time and space can be maximized in a phase-based TOF system. Preferably a decision as to which parameters shall be maximized should be determinable on-the-fly.

The present invention provides such a method and system.

SUMMARY OF THE PRESENT INVENTION

Phase-type time-of-flight (TOF) systems often require combining multiple pixel values to provide a depth (Z) value. In a so-called temporal mode, pixel values for a same (x,y) pixel location in the pixel array (x rows, y columns) but representing different captures in time may be combined to produce a depth reading. However in a so-called spatial mode, pixel values from neighboring (often adjacent) pixels within the pixel array in a same temporal capture may be combined to yield a depth value.

When target objects move, values for a same pixel in consecutive frames may not correspond to the same object. Similarly when a spatial edge occurs in the image then pixels values for neighboring pixels in a same capture may not correspond to the same object. In either case incorrect values may be combined thus producing an erroneous depth value. The undesired result from such temporal or spatial errors is that the pixel array can report an incorrect depth Z value that is not indicative of depth distance to either target object point. For example, if the sensor array images target object points at say 1 m and at 2 m, and those values are erroneously combined together then the erroneously report depth measurement might be Z=0.5 m. Thus, in a first aspect, the present invention addresses the problem of combining multiples pieces of consistent pixel data to yield accurate z depth information, despite changes in time or space that unless corrected can cause the TOF system to yield erroneous depth information. These errors, requiring correction, are sometimes referred to as bias error.

In a second aspect, the present invention recognizes that each pixel in the pixel array has an independent offset, that generally is different from the offset of other pixels in the array. When pixel values are combined either in time (from consecutive captures) or space (same capture but data taken from neighboring pixels) this offset must be cancelled or the TOF system will yield erroneous depth values. Thus, in time or in space, it is always desirable to cancel pixel offsets. In time or temporal mode, using temporarily preferably consecutive captures that are 180° apart, e.g.,)(0°-180° advantageously cancels the offsets, as values are taken from the same pixel. However if the target object is moving, motion blur may occur while sequential captures are obtained. On the other hand, spatial mode (and other modes) does not require consecutive captures, but pixel offset is not necessarily automatically canceled, even when using 0°, 180° captures. This is because values are being obtained from different pixels that typically each have different offsets. However spatial mode is less susceptible to motion blur because less time is required to image the target object, relative to using temporal mode.

The present invention advantageously can remove and model over time each pixel dependent offset, often without need to calibrate (i.e., explicitly measure, store and subtract) each pixel dependent offset. Discrete measurements may be intelligently combined in space and in time to compute a more accurate single depth or Z measurement, which can be computed using at least two discrete measurements in space and time. Embodiments of the present invention can configure a single image capture to facilitate high space-time resolution depth calculation. A sequence of capture configurations can be defined to enable removal of the pixel dependent offset as well as to maximize a desired combination of space-time resolution. Depth values may be computed by combining pixel values either in space or time. In a preferred embodiment selection of temporal pixel value combinations, spatial pixel value combinations or simultaneously both (e.g. combining multiple pixel values in a capture with data from other temporal captures) may be selected on a pixel basis depending on the scene. This per pixel location selection may be used to minimize a function of motion blur and spatial edge artifacts as well as other considerations.

Preferably a unique decoding algorithm is defined for each capture sequence, and the combination of capture sequence and decoding algorithm may be used to weight space-time resolution according to desired specifications. A corrective offset vector can be determined using preferably run time cancellation or calibration techniques. If desired, the decision to maximize either space or time resolution may be computed per pixel per frame on-the-fly.

To recapitulate, embodiments of the present invention enable a TOF system to operate with reduced depth error due to motion blur, and/or spatial blur, and/or pixel offset, by intelligently determining how best to combine pixel values, and how best to compensate for individual pixel offsets. Either or both of these determinations can be carried out on a per pixel basis, dynamically, in real-time during TOF operation, or on archived TOF data. Embodiments of the present invention can dynamically calculate offsets for individual pixels and subtract such offsets from the values acquired by those pixels, including calculating individual pixel offsets by combining data acquired by the same pixel at two acquisitions, 180° out of phase with respect to each other. Offsets may be calculated on a per pixel basis and averaged over multiple captures. To reduce motion blur, if target object motion is detected, one or more offset calculations can be discarded rather than averaged. In some embodiments, offsets acquired a priori during a TOF system calibration procedure may be used.

Other features and advantages of the invention will appear from the following description in which the preferred embodiments have been set forth in detail, in conjunction with their accompanying drawings.

DETAILED DESCRIPTION OF THE PREFERRED EMBODIMENT

It can be challenging in a phase-type time-of-flight (TOF) systems to intelligently combine multiple pixel values to provide accurate depth (Z) values so as to reduce mal-effects due to motion of the target object (motion blur), and due to spatial edges of the target object. Under some circumstances, spatially acquired pixel values should be combined, whereas under other circumstances, temporally acquired pixel values should be combined, where such circumstances may change dynamically. Complicating the problem of intelligently combining pixel values is the fact that different pixels in the TOF system pixel array have different offsets. Thus, embodiments of the present invention preferably intelligently determine not only how best to combine pixel values, but also determine how best to compensate for individual pixel offsets.

As noted, phase-type time of flight (TOF) systems can exhibit error due to the system integrating acquired pixel detection signals (values) to form a single depth value or array of values. Error may result from the target object moving during the time that multiple images are acquired to form the single depth frame. Error can also result from target object depth edges in space because neighboring pixels for different objects may be erroneously combined as though they relate to the same object. Suffice to say, it is not desired that pixel(s) in the pixel detector sensor array that image different target objects be combined, as erroneous Z depth data can result. As will now be described, embodiments of the present invention can optimize, preferably dynamically, operation in both space and time to minimize error from motion blur and object edge effects. As used herein, the term Zfast refers to the decision to maximize resolution in time with phase computed spatially. The term Zfine refers to the decision to maximize resolution in space, with phase computed temporally. The term Zsmart refers to an on-the-fly decision to optimize operation in space and/or in time.

Embodiments of the present invention advantageously can remove each pixel dependent offset, and can model each pixel dependent offset over time, without requiring calibration for each pixel dependent offset. Further, discrete measurements may be combined in space and time to compute a more accurate single depth measurement. The depth distance Z may be computed using at least two discrete measurements in space and time. Preferably the decision to maximize either space or time resolution may be computed per pixel per frame according to desired specifications. Frame rate typically may be on the order of say 30 frames/second.

Figure 1A:
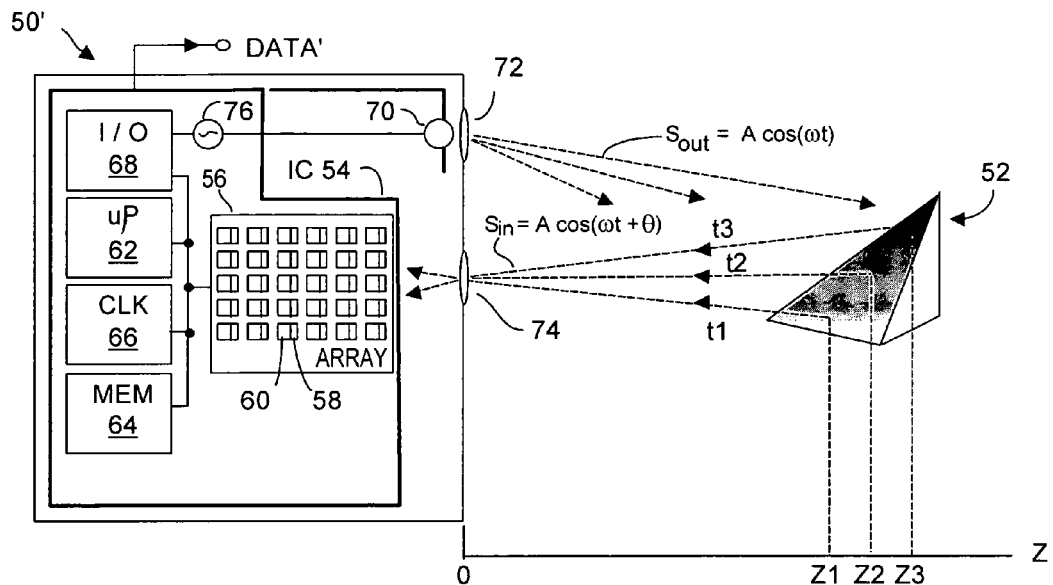
FIGS. 1B and 1C depict emitted and reflected optical energy waveforms associated with the imaging system of FIG. 1A, according to the prior art.
Figure 1B:
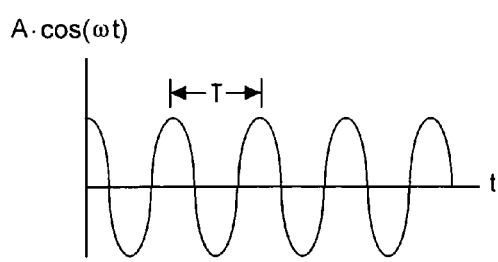
Figure 1C:
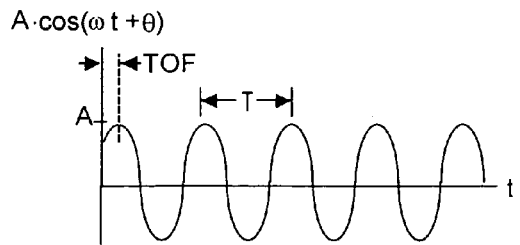

Principles of phase-type time of flight (TOF) systems have been described herein with reference to FIGS. 1A-1C. Although the description dealt with Canesta, Inc. type phase-based TOF systems, it is understood that the present invention may be applied to any phase-based TOF system. According to the present invention, a single component of the phase vector is measured by a detection pixel that is clocked at the same frequency as the emitted source of optical energy. A phase shift (PHI) is added to the pixel clock to measure a different component of the phase vector (DPHI). This projection will be referred to herein as a differential. By measuring orthogonal components of the phase vector at 0° and at 90° (referred to as D0 and D90), phase may be computed by atan 2(D90, D0). Range may then be inferred from the measured phase and the known modulation frequency. Table 1 below describes term nomenclature as used herein.

TABLE 1

| Nomenclature | Description |
|---|---|
| D0_m | Measured projection of the phase vector onto the x-axis. |
| D90_m | Measured projection of the phase vector onto the y-axis. |
| D180_m | Measured projection of the phase vector onto the x-axis. Pixel clocks 180° out of phase vs. D0_m. |
| D270_m | Measured projection of the phase vector onto the y-axis. Pixel clocks 180° out of phase vs. D90_m. |
| D0_a | True projection of the phase vector onto the x-axis. |
| D90_a | True projection of the phase vector onto the y-axis. |
| D180_a | True projection of the phase vector onto the x-axis. Opposite sign as D0_a. |
| D270_a | True projection of the phase vector onto the y-axis. Opposite sign as D90_a. |
| D_Offset | Pixel dependent offset. Value returned by the pixel when no active light is integrated. |
| Theta_m | Measured phase computed from measured components of the phase vector. |
| Theta_a | True phase computed by true components of the phase vector. |
| Theta_bias | Difference between true phase and measured phase. (As used herein, Theta_bias refers to phase bias caused by motion blur or failure to remove pixel offset.) |
| V_Offset | Pixel dependent offset vector. V_Offset = [D_Offset D_Offset] |
| V_A | True phase Vector. V_A = [D0_a D90_a] |
| V_M | Measured phase Vector. V_M = [D0_m D90_m] |

(Note: variables in bold font are vector quantities, while other, non-bolded, variables are scalar or vector component quantities.)

Due to pixel offset, measured differentials (D0_m and D90_m) are the sum of the active differentials (D0_a and D90_a) and a pixel dependent offset (D_Offset). The offset is theoretically identical for all values of PHI, as follows:

$$DPHI\_m = DPHI\_a + D\_Offset$$

$$D0\_m = D0\_a + D\_Offset$$

$$D90\_m = D90\_a + D\_Offset$$

$$D180\_m = D180\_a + D\_Offset$$

$$D270\_m = D270\_a + D\_Offset$$

Note that when there is no active (emitted) light, DPHI_active reduces to 0 and what is left is:

$$DPHI\_m = D\_Offset$$

Consequently, if phase is measured when there is no active light, then Theta_m is 45° or 225°, depending on the sign of the offset:

$$D0\_m = D\_\text{Offset}$$

$$D90\_m = D\_\text{Offset}$$

$$\text{Theta}\_m = \text{atan2}(D\_\text{Offset}, D\_\text{Offset})$$

$$\text{Theta}\_m = 45 \text{ degrees}(D\_\text{Offset} > 0), 225 \text{ degrees} (D\_\text{Offset} < 0)$$

Therefore, one can conclude that the offset vector lies along the line defined by y=x, which is true for all values of PHI.

Upon integrating active light within the pixel detector array, the active vector grows at an angle that is dependent on the distance of the imaged target object; unlike the offset vector. The measured phase vector, consequently, is the vector sum of the offset vector (distance independent) and the active vector (distance dependent). Thus, measuring depth distance correctly requires removal of the offset vector from the measured vector. That is, in order to remove bias, D_Offset must be removed from both D0_m and D90_m.

Figure 2:
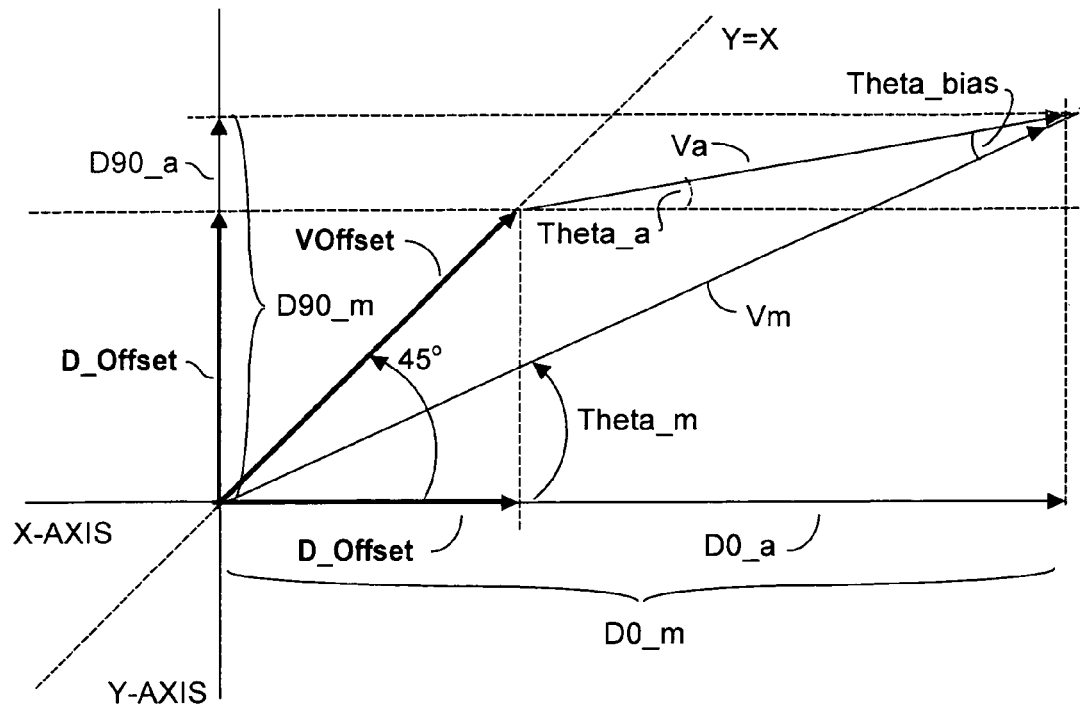
FIG. 2 depicts undesired phase bias resulting from pixel offset, according to the prior art.
Figure 3:
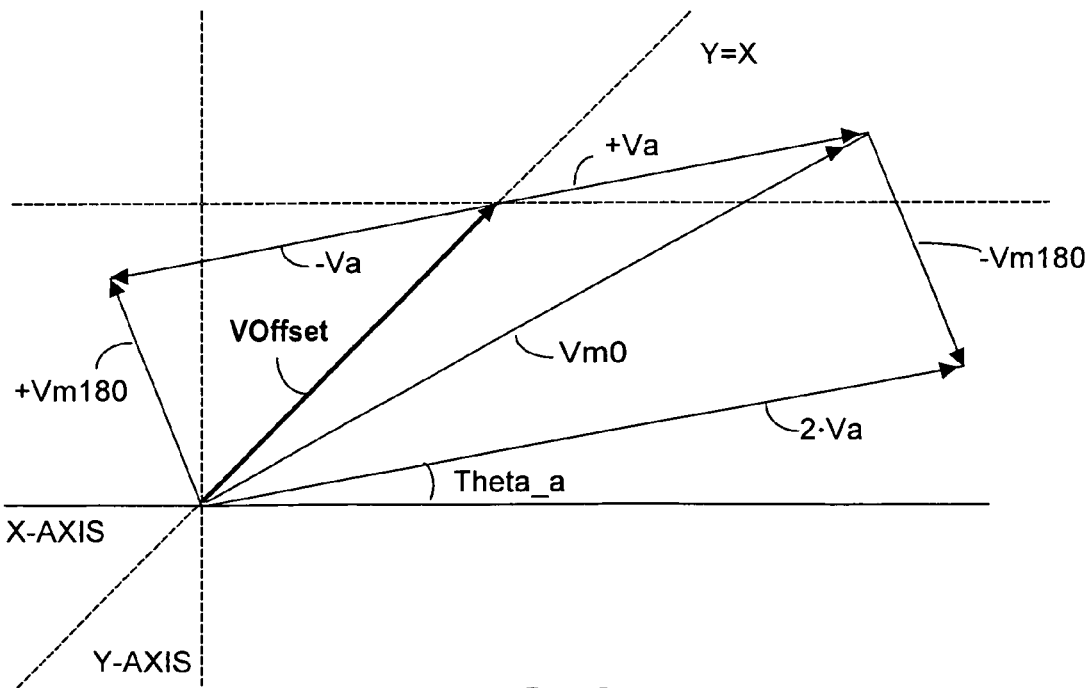
FIG. 3 depicts recovery of phase $\Theta_a$ from subtraction of (Vm0 and Vm180) prior to phase computation.

FIGS. 2 and 3 are helpful in illustrating the following useful relationships.

The phase from the active vector (needed to compute depth):

$$\text{Theta}\_a = \text{atan2}(D90\_a, D0\_a)$$

The offset vector (biases depth):

$$\text{Theta}\_\text{offset} = \text{atan2}(D\_\text{Offset}, D\_\text{Offset}) = 45 \text{ degrees}$$

The measured vector:

$$D0\_m = D\_\text{Offset} + D0\_a$$

$$D90\_m = D\_\text{Offset} + D90\_a$$

$$\text{Theta}\_m = \text{atan2}(D90\_m, D0\_m) = \text{atan2}(D90\_a + D\_\text{Offset}, D0\_a + D\_\text{Offset})$$

$$\text{Theta\_bias} = \text{Theta}\_m - \text{Theta}\_a$$

The offset vector can be removed using various techniques, most commonly cancellation and calibration, each technique having advantages and disadvantages. Consider first an offset vector cancellation approach.

Differential sensing yields the following useful property for static objects:

$$DPHI\_a = -D(PHI+180)\_a$$

Inverting the timing clock signals and taking the differential A−B, where A and B denote differential pixel input signals, simply inverts the sign of the active differential, and yields:

$$D0\_a = -D180\_a$$

$$D90\_a = -D270\_a$$

This property is extremely useful as it enables canceling out D_Offset using only measured differential values, without having to know D_Offset.

$$D0\_m = D0\_a + D\_\text{Offset}$$

$$D180\_m = D180\_a + D\_\text{Offset} = D\_\text{Offset} - D0\_a \text{ (notice substitution } D0\_a = -D180\_a\text{)}$$

The difference of the measured values can now be used to extract the active signal:

$$D0\_m - D180\_m = D0\_a + D\_\text{Offset} - (D\_\text{Offset} - D0\_a) = 2 * D0\_a$$

$$D90\_m - D270\_m = D90\_a + D\_\text{Offset} - (D\_\text{Offset} - D90\_a) = 2 * D90\_a$$

After this transformation, one can compute Theta_a without bias, using only known measured values:

$$\text{Theta}\,a = \text{atan2}(D90\_m - D270\_m, D0\_m - D180\_m)$$

The method of offset cancellation depicted in FIG. 3 has the potential disadvantage of requiring acquisition of two images from two discrete points in time. If the imaged target object moves during an integration or between integrations, the property DPHI_a=−D(PHI+180)_a no longer holds. The undesired result is herein called bias. Because D0_m and D180_m must be isolated, standard hardware implementation typically requires a readout between D0_m and D180_m integrations. This readout requirement increases the total time needed to capture and image, and consequently will image differences in the scene.

One can model offset vector calibration as a function of known system parameters, including, for example and without limitation, ambient light, temperature, shutter time, and conversion gain. If the offset vector is known, then it can be subtracted before computing phase.

Figure 4:
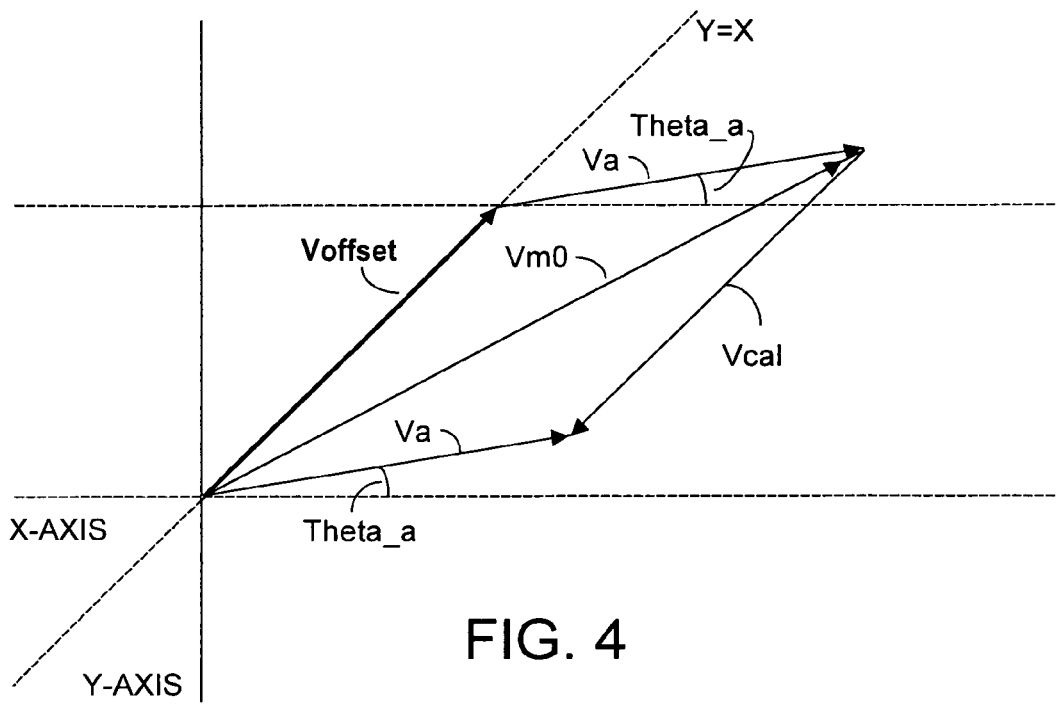
FIG. 4 depicts alternative recovery of phase $\Theta_a$ by summing (Vm0 and VCal) prior to phase computation, according to embodiments of the present invention.

With reference to FIG. 4, although offset vector calibration results in removal of the offset, this technique does require calibration. Calibration uses a model that is accurate over changes in temperature (and sometimes over changes in ambient light), which constraint is not always feasible for mass produced TOF systems. Further, calibration requires per pixel storage parameters and processor intensive on-the-fly computation. Also, offset model bias results in phase bias, as seen in FIG. 2.

Consider, now, temporal modeling of the offset vector. As stated earlier, differential sensing yields the following useful property for static target object:

$$DPHI\_a = -D(PHI+180)\_a$$

However it is also true that:

$$DPHI\_m = DPHI\_a + D\_\text{Offset}$$

By combining the two equations, one can solve for the offset $$D\_\text{Offset} = 0.5 * (DPHI\_m + D(PHI+180)\_m)$$

In a fashion similar to the describe D_Offset cancellation method, this enables determination of the value of the offset without having to explicitly solve for the offset value, as was required when using an offset calibration method.

Preferably pixel dependent offset at each frame is computed by taking the average of two images in which each pixel is clocked 180° out of phase. This is suitable for systems that use an integrated shutter (pixels are clocked directly) or an external shutter, such as Gallium Arsenide.

However similar to use of the offset vector cancellation method, however, the temporal model method is also subject to motion blur. Motion blur results because motion breaks the property DPHI_a=−D(PHI+180)_a, and consequently adds a portion of the active signal to the modeled offset. However, an attractive property of the offset is that for a given set of controlled system parameters, the offset reduces only to a function of temperature (and sometimes ambient light as well).

With respect to offset vector calibration modeling, one can state:

$$D\_Offset = K0 + K1 * TS * (\exp(beta*(T-T0))-1) + K2 * TS/CS$$

where TS=shutter, CS=CMR (common mode reset) time unit

For a given shutter and CMR setting, the offset equation reduces to:

$$D\_Offset = K0 + K1 * \exp(beta*(T-T0))$$

Although temperature cannot be controlled directly, it changes relatively slowly. That is, for a reasonable frame rate, the temperature is roughly constant for a large number of frames, and is slowly changing over time. Consequently, for a constant temperature, shutter, and common mode reset (CMR) setting (for example, as in the case above), the offset remains approximately constant for a large number of frames, and changes slowly over time.

More precisely, the derivative of the temperature with respect to time is small, and the offset reduces to a function of temperature. Therefore, the derivative of the offset is small with respect to time:

Observation: dT/dt is small $$d(D\_Offset)/dt = d(D\_Offset)/dT * dT/dt$$

$$d(D\_Offset)/dT = K1 * beta * \exp(beta*(T-T0))$$

$$d(D\_Offset)/dt = K1 * beta * \exp(beta*(T-T0)) * dT/dt$$

Conclusion: $d(D\_Offset)/dt$ is small

Given that the time derivative d(D_Offset)/dt is small, it is possible to model the offset over time by low pass filtering the output of the offset calculation (which may be the average of the two most recent frames, assuming that every other image is clocked 180° out of phase).

Motion can be filtered because it adds a high frequency component to the offset calculation.

Table 2 below summarizes the advantages and disadvantages of the above-described three methods of pixel offset removal.

TABLE 2

| Advantage | Cancellation | Calibration | Temporal Model |
|---|---|---|---|
| Single frame offset removal | | ✓ | ✓ |
| Low computation | ✓ | | ✓ |
| No calibration required | ✓ | | ✓ |
| Minimal disk storage required | ✓ | | ✓ |

From the standpoint of maximizing space-time resolution, a substantial advantage is single frame offset removal, which can be done using the calibration method or using the temporal model method. Note that the temporal model method advantageously requires no prior calibration, or storage, with relatively less computationally intensive filtering when compared to a per-pixel exponential model of the offset.

An important aspect in maximizing temporal resolution in a TOF system is to compute depth from a single frame, in which the offset needs to be removed before phase computation. This can be using either of the above two described methods, namely calibration or temporal modeling. Another important aspect to computing depth from a single frame is to obtain orthogonal differentials in a single frame, which can be done by clocking pixels at different phases. High temporal resolution may be desirable for applications such as object tracking.

Figure 5:
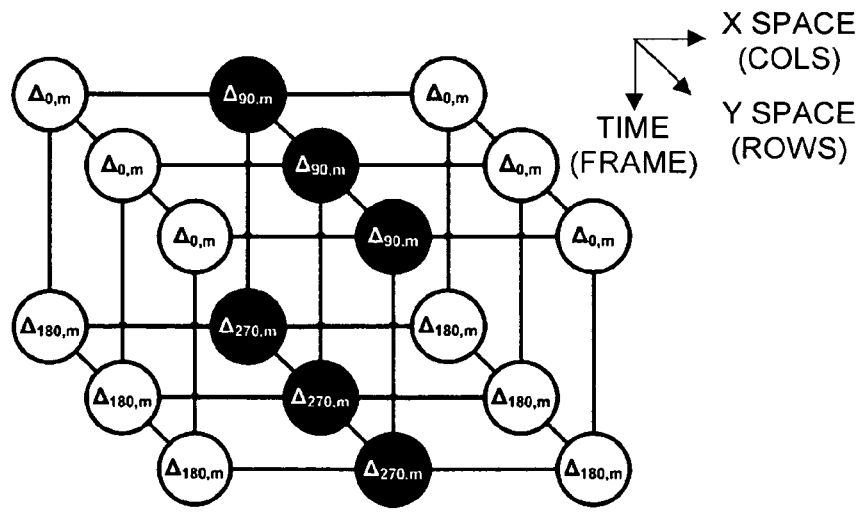
FIG. 5 depicts an exemplary sequence to maximize temporal resolution, according to embodiments of the present invention.

Referring to FIG. 5, in the above sequence, two image configurations are specified, each of which is 180° out of phase. Also, each pixel contains a 0°-90° edge in space, allowing for phase computation from two pixels in one frame. An exemplary decoding sequence is described with respect to FIG. 6.

Figure 6:
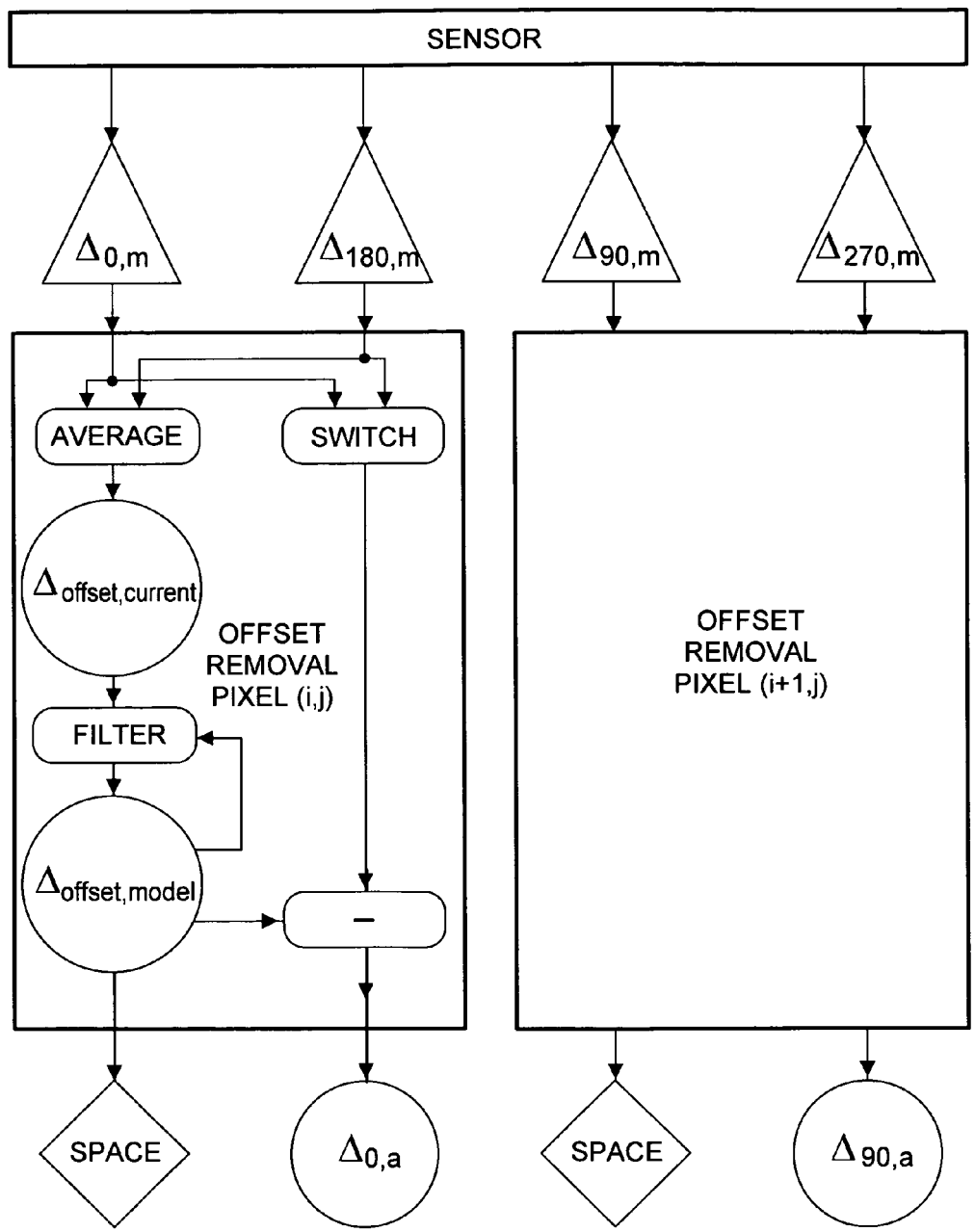
FIG. 6 depicts an exemplary decoding sequence and flow to maximize temporal resolution, according to embodiments of the present invention.

FIG. 6 depicts an exemplary decoding sequence and flow to maximize temporal resolution, wherein adjacent pixels are assigned to capture a different component of the phase vector. In this exemplary decoding sequence, measured differentials from the differential pixel sensor preferably are fed as input into offset removal blocks. Note that D0_m and D180_m come from different images in time. FIG. 6 depicts two offset removal blocks. Each offset removal block has two outputs: the offset removed active differential (D0_a or D90_a), and the indicator to compute phase in either space or time. This decision is preferably always "SPACE", e.g., Zfast, to maximize temporal resolution.

Figure 7A:
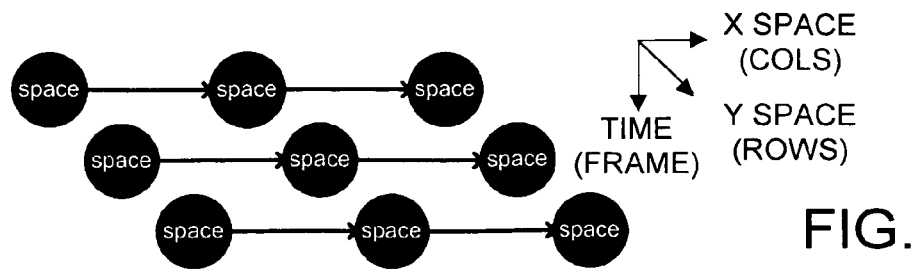
FIG. 7A depicts an output decision lattice from the exemplary decoding sequence of FIG. 6, according to embodiments of the present invention.
Figure 7B:
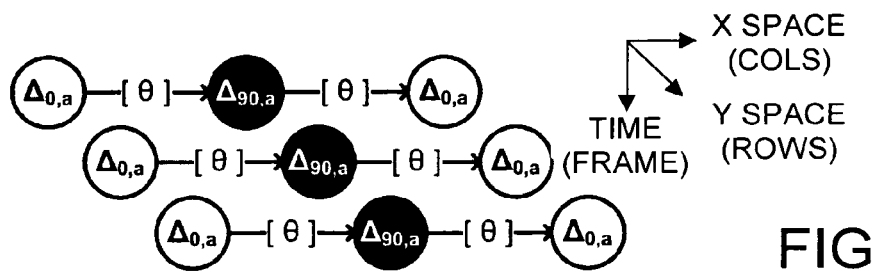
FIG. 7B depicts a decision lattice output active signal lattice to compute phase in space, exhibiting maximized temporal resolution, according to embodiments of the present invention.

Turning now to FIG. 7A, each node defines the decision output of a single pixel. The horizontally disposed arrows indicate the 0°-90° edge in space that is used to compute phase. In FIG. 7B temporal resolution is maximized, e.g., Zfast, and phase is preferably computed from a single frame in time, and from two pixels in space.

Maximizing spatial resolution according to the present invention will now be described. According to embodiments of the present invention, maximizing spatial resolution in a TOF system calls for computation of depth Z from a single pixel, preferably by clocking images at different phases. It is of course desired to maintain maximum temporal resolution within this restriction. Accordingly, according to embodiments of the present invention, offset preferably is still removed from each individual frame before phase computation. High spatial resolution may be desirable for many applications, e.g., digitization of a static object.

Figure 8:
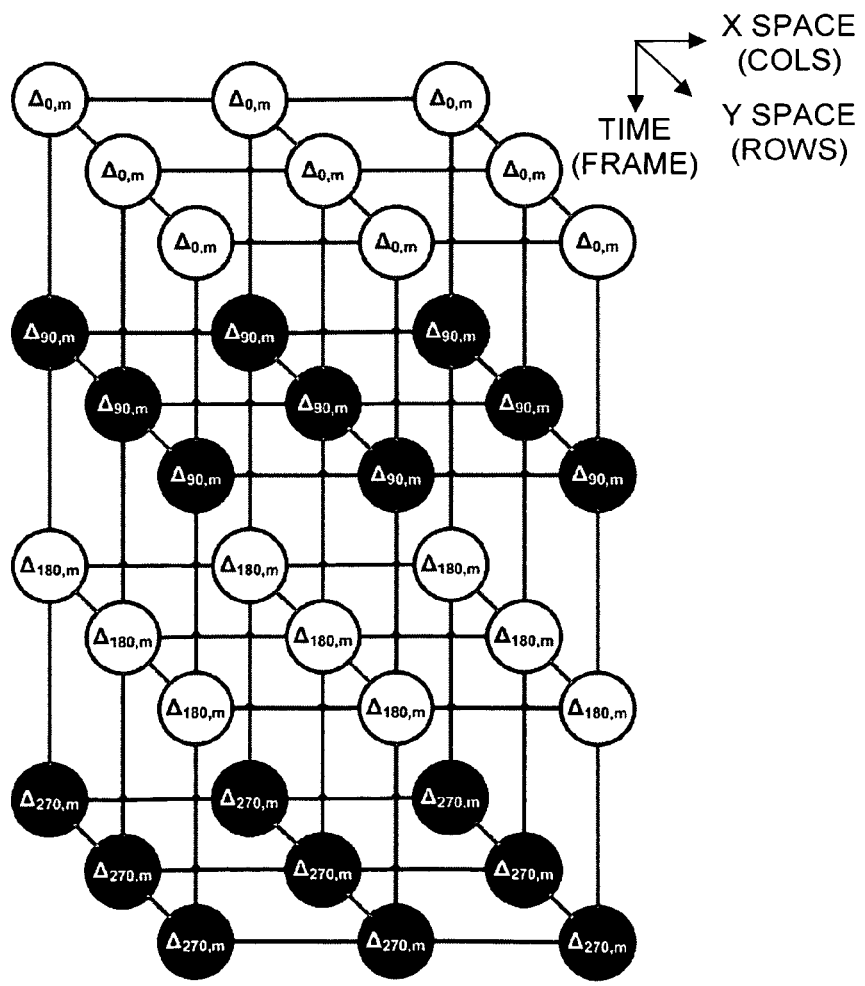
FIG. 8 depicts an exemplary sequence to maximize spatial resolution, according to embodiments of the present invention.
Figure 9:
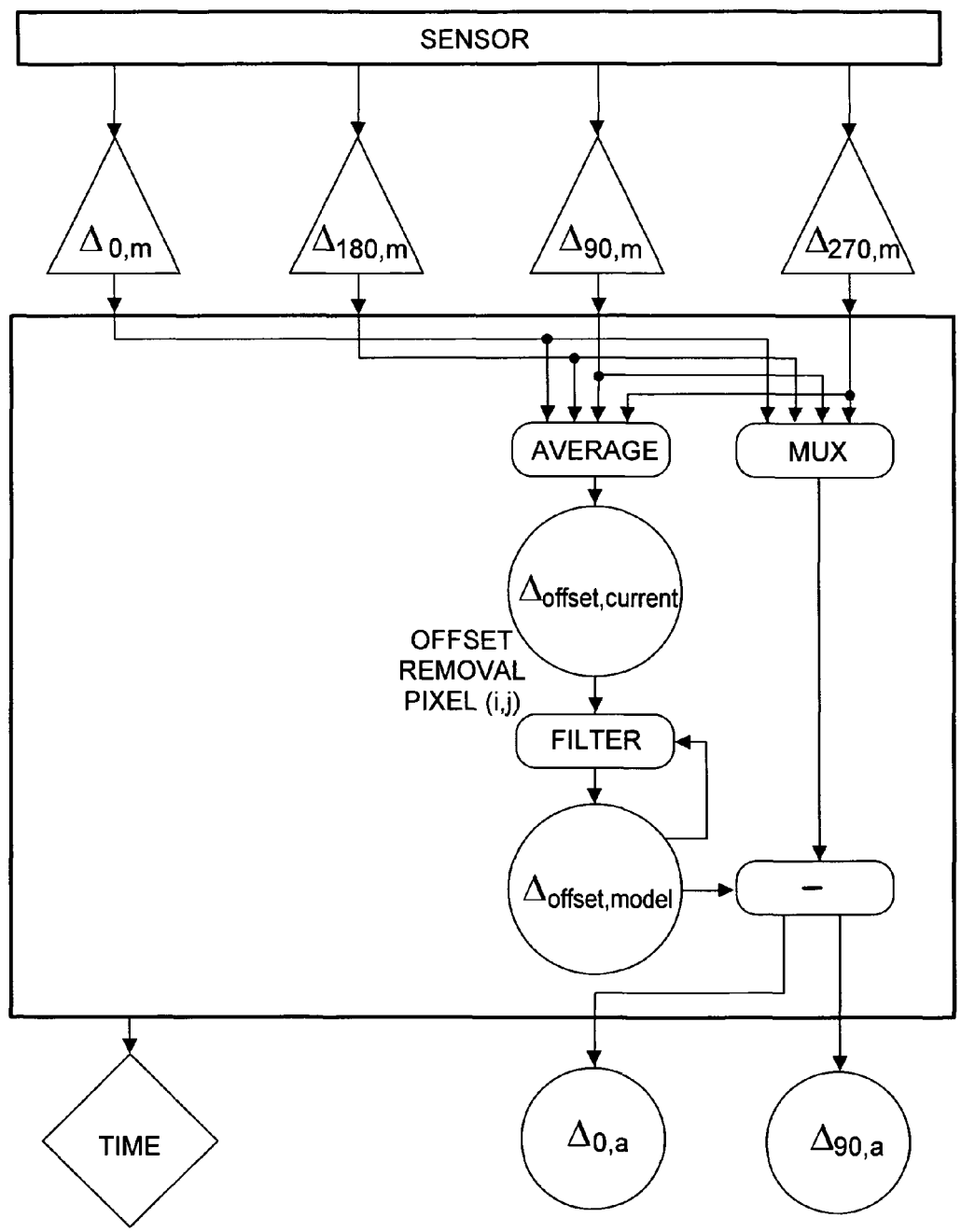
FIG. 9 depicts an exemplary decoding sequence and flow to maximize spatial resolution, according to embodiments of the present invention.

Turning now to FIG. 8, four image configurations are specified, with two pairs of images that are 180° out of phase. Also, each pixel contains a 0°-90° edge in time, which allows phase computation from a single pixel in two frames. The exemplary sequence of FIG. 8 may be denoted Zfine in that spatial resolution is maximized. FIG. 9 depicts an exemplary decoding sequence and flow to maximize spatial resolution, e.g., Zfine, wherein adjacent frames are assigned to capture a different component of the phase vector.

With respect to exemplary decoding sequence shown in FIG. 9, measured differentials from the sensor are fed into offset removal blocks. Note that D0_m, D90_m, D180_m, and D270_m come from different images in time. Each offset removal block preferably has three outputs: offset removed active differentials D0_a, D90_a, and an indicator to compute phase in either space or time. This indicator decisions preferably is always "TIME", e.g., Zfine, to maximize spatial resolution.

Figure 10A:
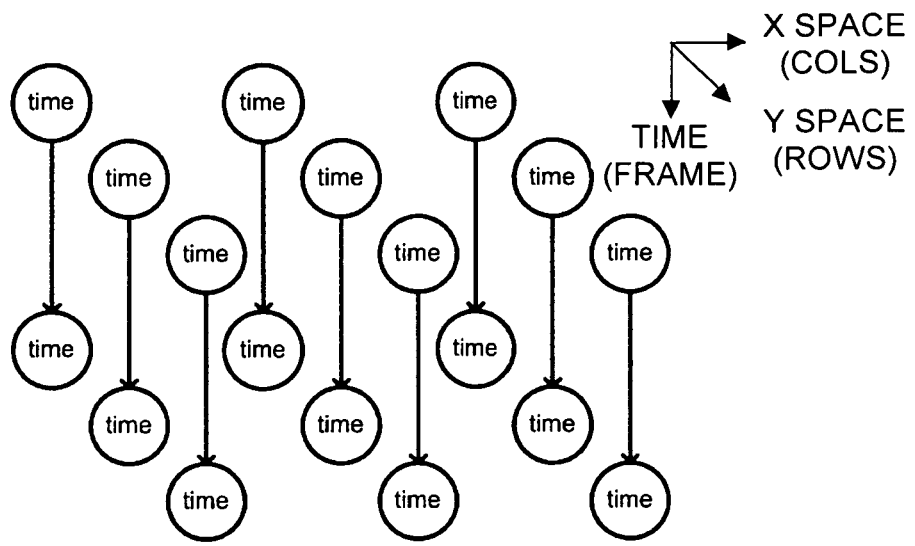
FIG. 10A depicts an output decision lattice from the exemplary decoding sequence of FIG. 9, according to embodiments of the present invention.
Figure 10B:
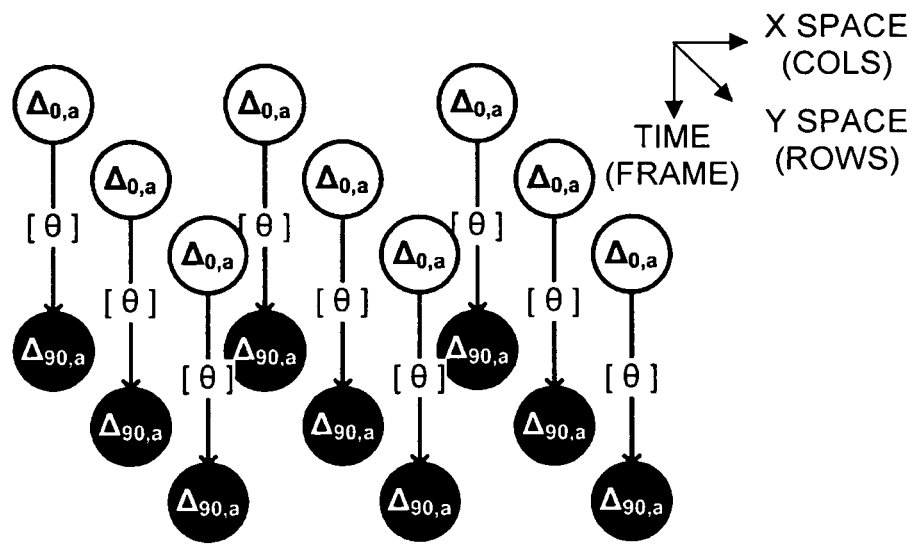
FIG. 10B depicts a decision lattice output active signal lattice to compute phase in time, exhibiting maximized spatial resolution, according to embodiments of the present invention.

FIG. 10A depicts an output decision lattice from the exemplary Zfine decoding sequence of FIG. 9. Referring to FIG. 10A, each node defines the decision output of a single pixel. The vertical arrow indicates the 0°-90° edge in time that is used to compute phase. FIG. 10B depicts an exemplary output active signal lattice used to compute phase in time and maximize spatial resolution. In this embodiment, phase is computed from a single pixel in time, and from two images in time.

It is seen from the above descriptions involving maximizing space (Zfine) or time (Zfast) resolution in a TOF that one first removes the offset from a single frame. Having removed this offset from a single frame, then either temporal resolution is maximized by computing phase along 0°-90° edges in space, e.g., Zfast, or spatial resolution is maximized by computing phase along 0°-90° edges in time, e.g., Zfine.

However the decision to compute phase in space or time need not be globally limited. Indeed one can make on-the-fly decisions to maximize time/space resolution. Such on-the-fly decision making may be denoted as Zsmart. For example, on-the-fly determination is permissible if at each point in time, each pixel has at least one available 0°-90° edge in space, and has at least one available 0°-90° edge in time. For some applications, it may be desirable for certain pixels to maximize temporal resolution while other pixels maximize spatial resolution. An exemplary such application would be tracking movement of a human player in an intricate background scene.

Figure 11:
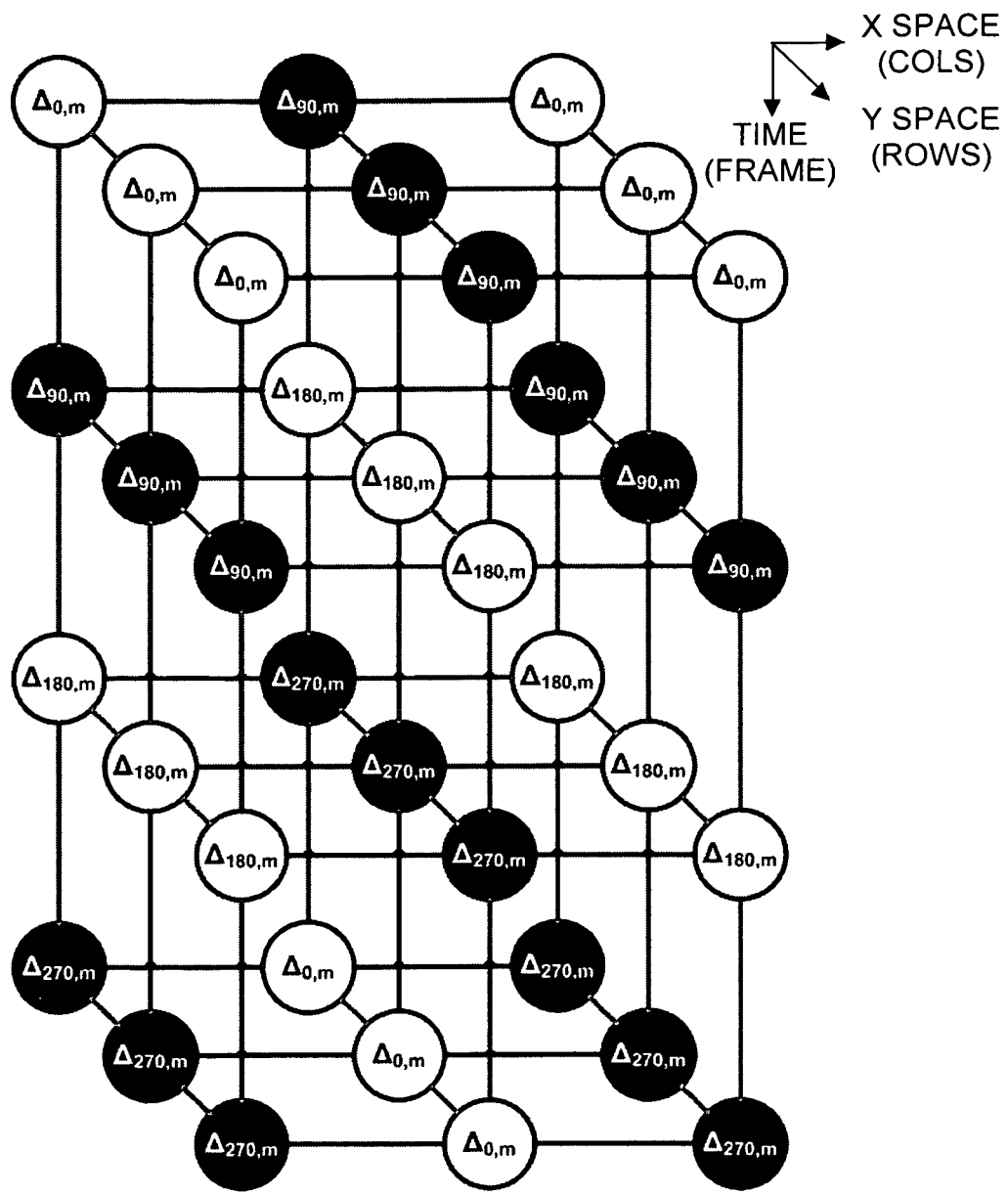
FIG. 11 depicts an exemplary sequence enabling on-the-fly decision making to maximize either temporal resolution or spatial resolution, according to embodiments of the present invention.
Figure 12:
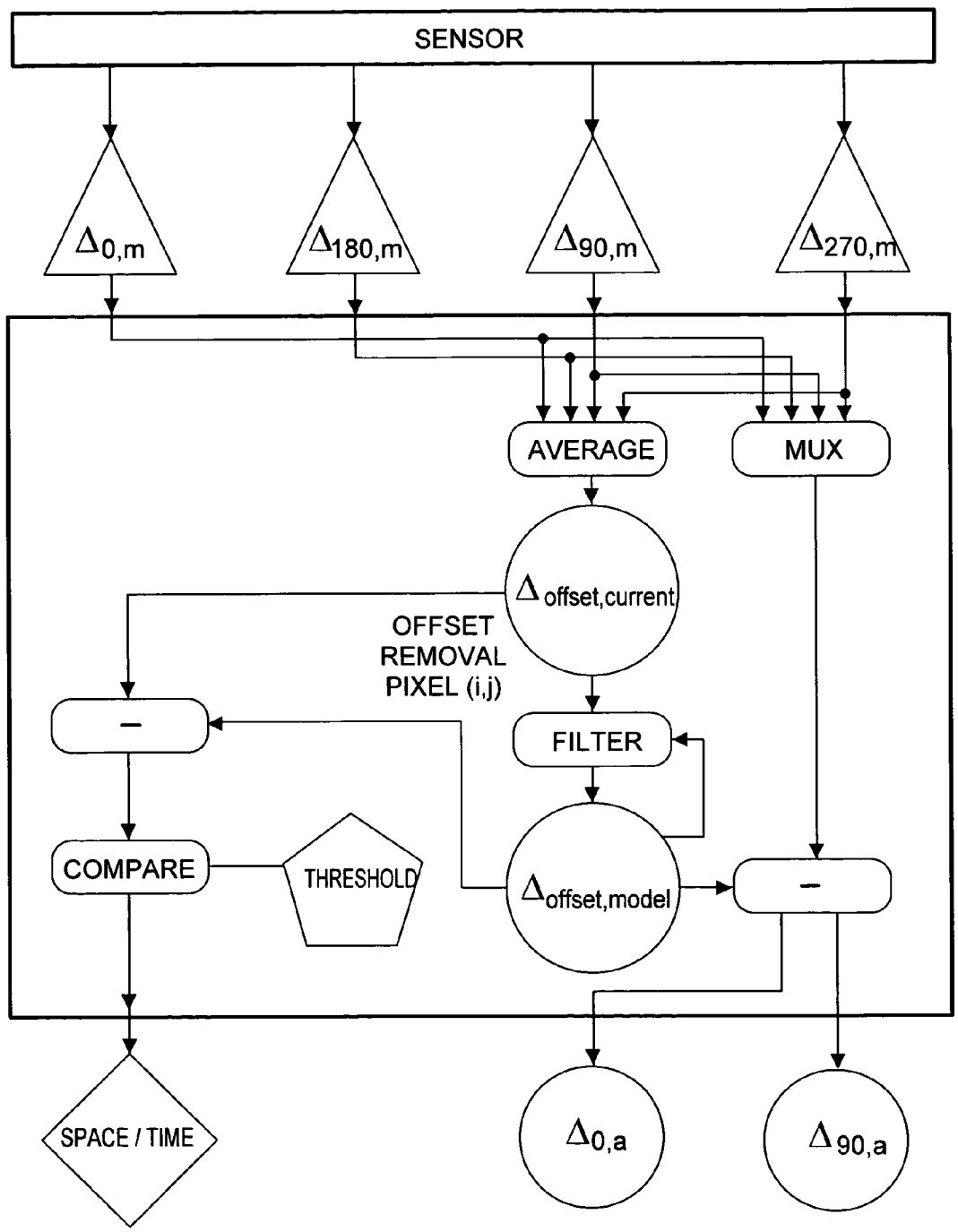
FIG. 12 depicts an exemplary decoding sequence, for the exemplary sequence of FIG. 11, according to embodiments of the present invention.

Consider now the exemplary sequence to facilitate Zsmart or on-the-fly decision making to maximize space resolution or time resolution depicted in FIG. 11. Four image configurations are specified, namely two pairs of images that are acquired 180° out of phase. Each pixel contains a 0°-90° edge in time and in space, allowing for phase computation from a single pixel in two frames, or from two pixels in a single frame. An exemplary decoding sequence for the sequence of FIG. 11 is depicted in FIG. 12.

Figure 13A:
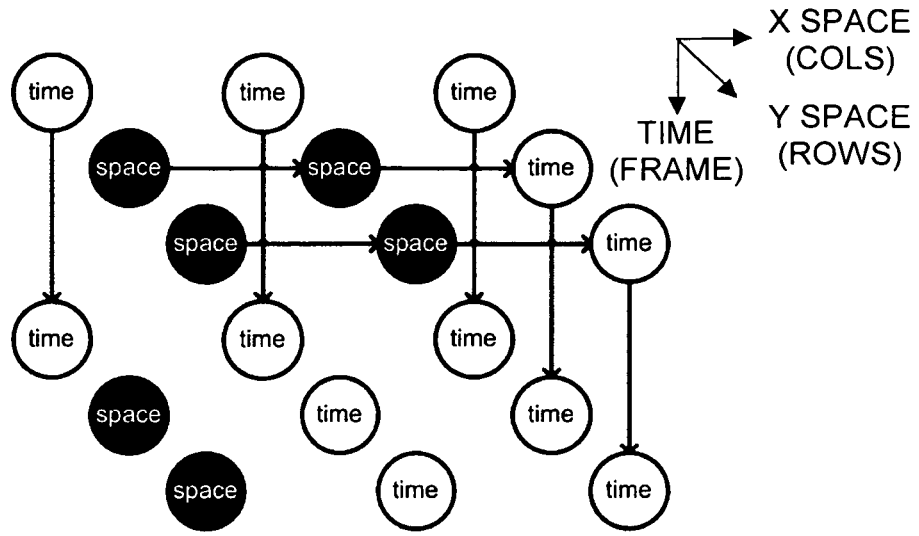
FIG. 13A depicts an exemplary output decision lattice from the exemplary decoding sequence of FIG. 12, according to embodiments of the present invention.
Figure 13B:
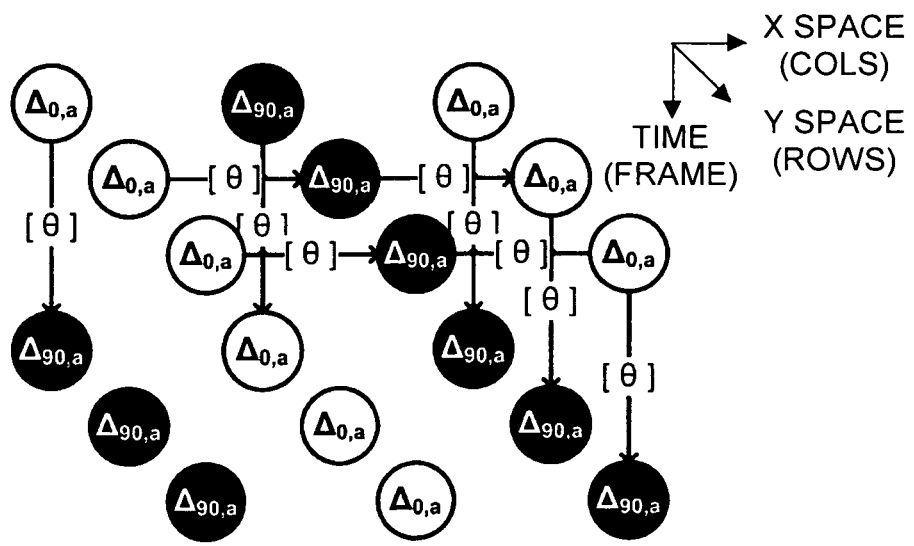
FIG. 13B depicts an exemplary decision output active signal lattice in which each pixel has chosen to maximize resolution in either space or in time, for the output decision lattice of FIG. 13A, according to embodiments of the present invention.

FIGS. 13A and 13B depict on-the-fly computations of the decision output using methodology similar to that of FIGS. 7A, 7B, 10A, and 10B. FIG. 13A depicts an exemplary output decision lattice from the on-the-fly decoding sequence shown in FIG. 12. In FIG. 13A, horizontally disposed arrows indicate that a pixel has chosen to compute phase along a 0°-90° edge in space. Vertically disposed arrows indicated that a pixel has chosen to compute phase along a 0°-90° edge in time. FIG. 13B depicts an exemplary decision output active signal lattice in which each pixel has chosen to maximize resolution in either space or in time, for the output decision lattice of FIG. 13A. In FIGS. 13A and 13B, the decoding sequence and flow maximize temporal or spatial resolution using a decision output that is computed on-the-fly. In these exemplary decoding sequences, measured differentials from the pixel sensor are fed into offset removal blocks. Again, note that D0_m, D90_m, D180_m, and D270_m come from different images in time, and there may be movement of the scene in between measurements. When movement is detected, it may be desirable to compute phase in space, maximizing temporal resolution. Otherwise, it is desirable to compute phase in time, maximizing spatial resolution. Since there is knowledge that d(D_Offset)/dt is small, the most recent offset may be compared to the offset model. If the estimated derivative is too high, then it must be that the object has moved, and the output is "SPACE"; otherwise it is "TIME".

In FIG. 13A, each node defines the decision output of a single pixel. A horizontally disposed arrow indicates that a pixel has chosen to compute phase along a 0°-90° edge in space. A vertically disposed arrow indicates that a pixel has chosen to compute phase along a 0°-90° edge in time.

In FIG. 13B, the output active signal lattice uses decision lattice to compute phase in space or time, maximizing spatial or temporal resolution. In exemplary FIG. 13B, phase can be computed from a single frame in time and two pixels in space, or can be computed from a single pixel and two images in time. Of course, this decision need not be Boolean, and output phase may be a weighted combination of any 0°-90° edges in space or time.

Figure 14:
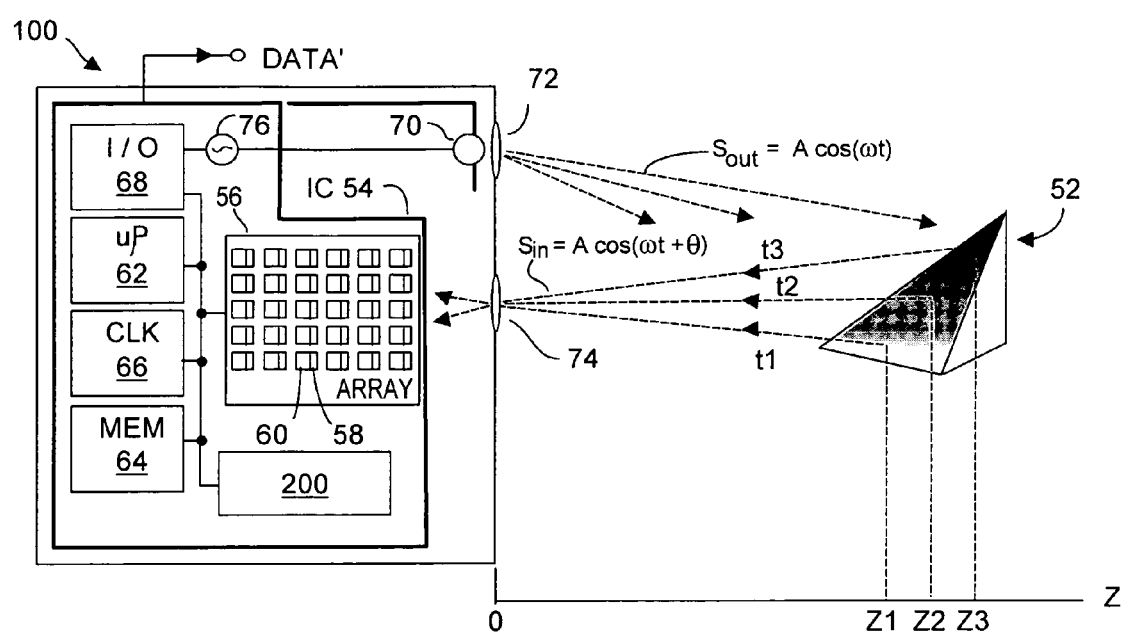
FIG. 14 depicts a phase-based TOF system provided with a system implementing the present invention.

FIG. 14 depicts a phase-based TOF system 100 provided with a system 200 implementing the present invention, which need not be formed on IC 54. System 200 provides functions to determine how best to combine pixel values to yield accurate depth data, and to determine how best to compensate for individual pixel offsets to yield accurate depth data. System 200 can function, in whole or in part, on a per pixel basis, dynamically, in real-time during operation of TOF system 100, or indeed on previously obtained and archived TOF data. In short, system 200 can carry out any or all of the embodiments described herein, including dynamically calculating offsets for individual pixels and subtracting dynamically calculated said offsets from pixel values acquired by the pixels, as well as combining data acquired for a same pixel at two acquisitions 180 degrees out of phase with respect to each other. System 200 can average calculated offsets, or if potential motion blur condition is detected, one or more offset calculations can be discarded rather than averaged. Further, system 200 can use pixel offsets acquired a priori and perhaps stored in memory 64, or in memory associated with system 200 during a calibration procedure for TOF system 100. Providing TOF system 100 with system 200 results in more accurate determination of depth values, for the reasons described herein.

Modifications and variations may be made to the disclosed embodiments without departing from the subject and spirit of the invention as defined by the following claims.

What is claimed is:

1. A method of reducing depth error for a TOF system providing emitted optical energy toward a target object using an array of pixels to detect at least a portion of reflected optical energy, and determining a distance to said target object by comparing a phase of the emitted optical energy with a phase of the reflected optical energy detected, the method comprising: (a) determining how to combine values of the reflected optical energy detected in time or space from pixels included in the array of pixels to yield depth data using one or both of a temporal model and a spatial model; and (b) determining how to compensate for individual pixel offsets to yield the depth data.

2. The method of claim 1, wherein at least one of step (a) and step (b) is carried out on a per pixel basis.

3. The method of claim 1, wherein at least one of step (a) and step (b) is carried out dynamically.

4. The method of claim 1, wherein at least one of step (a) and step (b) is carried out in real-time.

5. The method of claim 1, wherein step (a) and step (b) are carried out upon previously acquired and stored time-of-flight data.

6. A method of reducing depth error for a TOF system adapted to provide emitted optical energy toward a target object, and to detect using an array of pixels at least a portion of reflected optical energy to determine a distance to said target object by comparing a phase of the emitted optical energy with a phase of the reflected optical energy, the method comprising: (a) determining how to combine values from pixels in said array to yield depth data; and (b) determining how to compensate for individual pixel offsets to yield depth data, wherein step (b) includes dynamically calculating offsets for individual pixels and subtracting dynamically calculated said offsets from pixel values acquired by said pixels.

7. The method of claim 6, wherein individual pixel offsets are calculated by combining data acquired for a same pixel at two acquisitions 180 degrees out of phase with respect to each other.

8. The method of claim 7, wherein said calculated offsets are averaged.

9. The method of claim 8, wherein on a per pixel base, upon detection of motion of said target object, at least one offset calculation is discarded rather than averaged.

10. The method of claim 1, wherein step (b) includes using offsets acquired a priori during a time-of-flight system calibration procedure.

11. A phase-type TOF system operable to provide emitted optical energy toward a target object, and operable to provide detect with an array of pixels at least a portion of reflected optical energy, and operable to determine a distance to said target object by comparing a phase of the emitted optical energy with a phase of the reflected optical energy, comprising: a decoder configured to compare accuracy of combined values of the reflected optical energy in time and in space from pixels included in said array to yield depth data, the decoder configured to select one or both of time and space to combine said values to yield said depth data and determine how to compensate for individual pixel offsets to yield the depth data.

12. The system of claim 11, wherein said decoder is configured to determine how to combine said values and how to compensate on a per pixel basis.

13. The system of claim 11, wherein said decoder is configured to determine how to combine said values and determine how to compensate dynamically.

14. The system of claim 11, wherein said decoder is configured to function in real-time.

15. The system of claim 11, wherein a said decoder is configured to operate upon previously acquired and stored time-of-flight data.

16. The system of claim 11, said decoder is configured to compensate by dynamically calculating offsets for individual pixels and subtracting dynamically calculated said offsets from pixel values acquired by said pixels.

17. The system of claim 16, wherein said decoder calculates individual pixel offsets by combining data acquired for a same pixel at two acquisitions 180 degrees out of phase with respect to each other.

18. The system of claim 17, wherein said decoder is operable to average said calculated individual pixel offsets.

19. The system of claim 18, wherein on a per pixel basis, upon detection of motion of said target object, at least one offset calculation is discarded rather than averaged.

20. The system of claim 11, wherein said decoder uses offsets acquired a priori during a time-of-flight system calibration procedure.

* * * * *